United States Patent [19]

Arai

[11] 4,326,723
[45] Apr. 27, 1982

[54] OIL SEAL

[76] Inventor: Yoshio Arai, 1-26-26, Koganehara, Matsudo-shi, Chiba-ken, Japan

[21] Appl. No.: 189,217

[22] Filed: Sep. 22, 1980

[30] Foreign Application Priority Data

Oct. 11, 1979 [JP] Japan ................ 54-131075

[51] Int. Cl.³ .............................. F16J 15/32
[52] U.S. Cl. ................... 277/153; 277/166; 277/182; 277/184
[58] Field of Search ............. 277/166, 181, 182, 183, 277/184, 179, 152, 153

[56] References Cited

U.S. PATENT DOCUMENTS

| | | | |
|---|---|---|---|
| 2,208,482 | 7/1940 | Victor | 277/182 |
| 2,873,153 | 2/1959 | Haynie | 277/153 |
| 2,950,506 | 8/1960 | Corsi | 277/153 |
| 3,275,332 | 9/1966 | May | 277/184 |
| 4,211,152 | 7/1980 | Colletti et al. | 277/153 |

*Primary Examiner*—Robert I. Smith
*Attorney, Agent, or Firm*—Armstrong, Nikaido, Marmelstein & Kubovcik

[57] ABSTRACT

A metal periphery type oil seal having a metallic reinforcement ring of a substantially L-shaped section. The ring is provided with an outer peripheral portion adapted to be fitted into a stationary portion and an annular side portion having its inner end in sliding contact with a rotary shaft. The outer peripheral portion is inwardly curved at its free end and the annular side portion is also bent at its inner end to improve the rigidity of the ring. A rubber lip is secured by baking to the annular side portion of the ring so as to clamp the inner peripheral end thereof. The rubber lip is integrally formed with an annular rubber plate which is secured by baking to the outer surface of the annular side portion. The outer peripheral portion and the annular side portion of the ring are connected with each other through a two-stepped bent portion with an annular cavity formed on the outer surface thereof. The annular cavity is filled with an enlarged rubber ring which has an outer diameter not less than that of the reinforcement ring so as to completely check the oil leakage. A plurality of reinforcement ribs are preferably formed on the bent inner end of said annular side portion.

2 Claims, 2 Drawing Figures

OIL SEAL

BACKGROUND OF THE INVENTION

1. Field of the Invention

The present invention relates to an oil ring of metal periphery type oil seal and, more particularly, to an oil seal having at its outer peripheral portion a metallic reinforcer ring adapted to be fitted to a stationary part such as a housing of a machine and at its inner peripheral portion a rubber lip adapted for making a sliding contact with a rotary shaft.

2. Description of the Prior Art

Oil seals have been widely used as shaft seal device for preventing working oil or lubricating oil from leaking outside through a rotary shaft portion of hydraulic pump, bearing box and so forth. Various types of oil seals have been proposed and used in accordance with condition of use.

Among these oil seals, an oil seal of a type called metal periphery type oil seal is suitably used for sealing oil of a comparatively high pressure as in the case of hydraulic machines.

This type of oil seal has an outer peripheral reinforcement ring made of a metal and adapted to be fixedly fitted to a stationary part such as housing. Since the housing is usually made of a metal, a metal fit is achieved between the reinforcement ring and the housing to present a high fitting strength to withstand a high pressure.

This metal fit, however, requires a high precision of the fitting parts of these two metallic members. For this reason, the reinforcement ring is shaped by a precise and minute drawing die or the outer peripheral surface of the same is polished. If an axial scratch or the like damage is caused on the outer surface of the reinforcement ring due to friction or the like during fitting, the oil may undesirably leak through such a scratch or damage.

As a countermeasure for overcoming this porblem, it has been proposed to apply a rubber coating such as a sealant to the outer peripheral surface of the reinforcment ring. This countermeasure, however, requires an increased number of steps and incurs a rise of the cost.

The reinforcement ring of the metal periphery type oil seal has a substantially L-shaped section, one side portion of which constitutes the outer periphery of the oil seal while the other constituting the side part at the inner end of which attached is a rubber lip.

In this type of reinforcement ring, only one bend is provided between two sides of L-shape of the section. With such a sectional shape, it is necessary to increase the thickness of the reinforcement ring in order that the ring can withstand the stress which is generated therein when the ring is fitted to the housing.

In order to improve the strength of the reinforcement ring, it may be bent inwardly at an outer peripheral edge. If, however, the bent portion has a small radius of curvature no satisfactory increment of the strength would result.

In the metal periphery type oil seal of the kind described, it is also required to provide as large contact area as possible between the reinforcement ring and the housing, in order to ensure a tight fit therebetween to obtain a sufficient fitting strength and to prevent the leak of oil therethrough. For these reasons, the radius of curvature of the bend between two sides of the L-shaped section of the reinforcement ring is usually selected small. Such a small radius of curvature, however, causes a stress concentration which in turn requires an increment of thickness of the reinforcement ring.

The increase of the ring thickness incurs not only a difficulty in processing but also an increase in weight of the oil seal as a whole.

In the metal periphery type oil seal, a rubber member shaped integrally with the rubber lip is secured by baking to the entire inner surface of the reinforcement ring having the L-shaped section, in order to securely attach the lip to the metallic reinforcement ring.

In case of rubber periphery type oil seal, the rubber constituting the outer peripheral portion of the oil seal occupies about ⅓ of the whole seal, so that an uneconomically large amount of rubber is required to incur a material cost, although the problem concerning the oil leak at the outer periphery is less severe.

SUMMARY OF THE INVENTION

Under these circumstances, the present invention aims at providing a metal periphery type oil seal in which the thickness of the metallic reinforcement ring is reduced while preserving a strength sufficiently large to withstand the fitting stress and completely avoiding the leak of oil from the outer peripheral portion.

With such a construction, the weight of the oil seal is reduced as well as the material cost. In addition, the processing and mounting of the oil seal are much facilitated.

It is, therefore, a major object of the invention to provide a light-weight metal periphery type oil seal which requires reduced amount of material.

It is another object of the invention to provide a metal periphery type oil seal in which the reinforcement ring has an extremely reduced thickness but still preserving a mechanical strength high enough to withstand the stress generated as a result of the fitting.

It is still another object of the invention to provide a metal periphery type oil seal in which the tolerance of size of the reinforcement ring is large and in which the leak of oil is prevented even if the outer peripheral surface is damaged.

It is a further object of the invention to provide a metal periphery type oil seal in which the attaching of the rubber lip to the metallic reinforcement ring is improved to reduce the amount of rubber used.

The metal periphery type oil seal of the invention incorporates a metallic reinforcement ring having a substantially L-shaped section, the bottom side of which constitutes the outer peripheral portion of the oil seal. One end of this bottom is bent inwardly at a large radius of curvature. The portion between this bottom part and the side part is bent in two steps to increase the rigidity against radial stress and to disperse the stress which is otherwise concentrated on the bent portion.

The side portion of the reinforcement ring, which constitutes the side part of the oil seal, is bent at its inner periphery toward the oil chamber and a rubber lip is secured to the bent inner peripheral end in a clamping manner.

An annular rubber plate integral with the lip and having an enlarged rubber ring at its outer periphery is secured by baking to the outer surfaces of the side part and the two-tepped bend portion of the metallic reinforcement ring. The enlarged rubber ring has an outside diameter which is equal to or slightly greater than the outside diameter of the reinforcement ring.

Thus, in the oil seal of the invention, the metallic reinforcement ring has a substantially L-shaped section and is suitably bent at several points so that a sufficiently high mechanical strength is obtained even with the reduced thickness. The reduced thickness of the reinforcement ring in turn offers advantages such as reduction of weight of the oil seal and facilitated processing. In addition, the tightness of the fit is enhanced thanks to the increased resiliency of the reinforcement ring. For the same reason, the anti-eccentricity characteristic and the anti-vibration characteristic of the oil seal are improved. The enlarged rubber ring portion around the metallic reinforcement ring completely checks the leak of oil. In addition, the rubber lip which is attached to the inner peripheral end of the reinforcement ring can hardly fall off from the latter because it clamps the inner peripheral edge of the reinforcement ring. The amount of rubber used is therefore reduced to save the material and to reduce the weight of the oil seal as a whole.

These and other objects, as well as advantageous features of the invention will become clear from the following description of the preferred embodiments taken in conjunction with the accompanying drawings.

DESCRIPTION OF THE PREFERRED EMBODIMENTS

Figure 1:
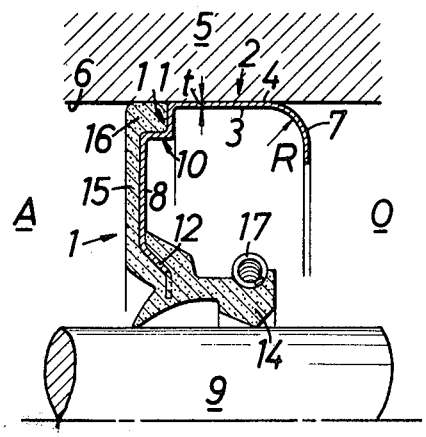
FIG. 1 is a longitudinal sectional view of a part of a metal periphery type oil seal constructed in accordance with the invention in the state mounted between a housing and a rotary shaft.

Referring to FIG. 1, a metal periphery type oil seal 1 of the invention has a metallic reinforcement ring 2 having a substantially L-shaped section. The reinforcement ring 2 has an extremely small thickness which amounts to $\frac{1}{2}$ to $\frac{1}{3}$ of that of the conventional oil seal. For instance, in an oil seal for use in combination with a shaft of 70 mm dia., the reinforcement ring of the conventional oil seal had a thickness of about 1 mm, while the reinforcement ring of the invention has a thickness of about 0.5 mm. The reinforcement ring 2 has an outer peripheral portion 3 the surface 4 of which is adapted to make a shrinkage fit to the inner peripheral surface 6 of the housing 5. Therefore, the reinforcement ring 2 is fixed to the housing 5 as the oil seal 1 is fitted to the housing 5. The free end 7 of the outer peripheral part 3 of the reinforcement ring 2 is bent inwardly at its portion adjacent to the oil chamber O at a sufficiently large radius of curvature well reaching 3 to 5 times or more as large as the thickness t of the reinforcement ring.

Figure 2:
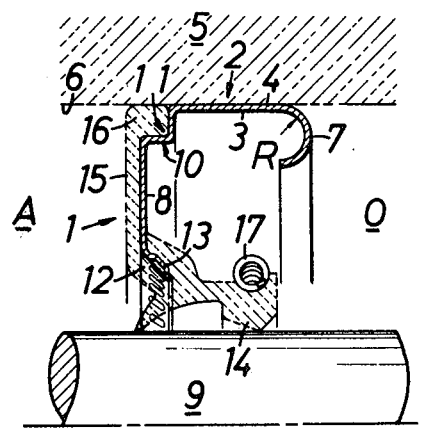
FIG. 2 is a longitudinal sectional view of a part of metallic reinforcement ring incorporated in another embodiment of the invention.

When it is necessary to further increase the strength of the reinforcement ring 2, the free end 7 may be bent or curved over an angle of about 180° or greater as shown in FIG. 2, although in usual case a bending curve extending over 90° is sufficient. The radius of curvature R is selected large also in this case.

The reinforcement ring 2 is further provided with a back side part 8 which extends toward the rotary shaft 9 from the outer periphery 3 to form an annular side part at the same side as the atmospheric side A of the oil seal. A two-stepped bend 10 is formed between the annular side part 8 and the outer peripheral part 3, and a vacant space 11 is formed at the outside of the bend 10. The inner peripheral end 12 of the annular side part 8 of the reinforcement ring 2 is bent toward the oil chamber O.

As will be seen from FIG. 2, a plurality of small ribs 13 are formed on the inner face of the inner peripheral end 12 so as to reinforce the latter, although not essential. Alternatively, the inner peripheral end 12 may be provided with an inwardly extending extension as shown by broken line in FIG. 1.

A rubber lip 14 and an annular rubber plate 15 integral with the former are attached to the reinforcement ring 2. The lip 14 is secured by baking in such a manner as to clamp the inner peripheral end 12 of the annular side part 8 of the reinforcement ring 2, while the annular rubber plate 15 is baked and secured along the outer surface of the side part 8 of the ring to reach the outer surface of the bend 10.

For securing the lip 14 and the annular rubber plate 15 by baking to the reinforcement ring 2, the latter is placed in a mold into which the rubber material is poured to unitarily attach the rubber to the ring 2. In such a molding process, the rubber flows along the annular side part 8 to completely fill the vacant space 11 outside the bend 10, so that an enlarged rubber ring portion 16 is formed integrally with the rubber plate 15. The enlarged rubber ring 16 has an outside diameter equal to or somewhat greater than that of the reinforcement ring 2.

As the oil seal 1 is fitted to the housing 5, the outer peripheral surface 4 of the reinforcement ring 2 is shrink fitted to the inner peripheral surface 6 of the housing 5 thereby to fix the oil seal 1. At the same time, the enlarged rubber ring portion 16 is compressed between the inner peripheral surface 6 of the housing 5 and the outer surface of the bend 10 of the reinforcement ring 2 so that the leak of oil is completely checked even if there is a scratch or the like damage in the outer peripheral surface 4. In addition, since the major part of the leaking oil is stopped by the metal fit between the reinforcement ring 2 and the housing 5, the rubber ring 6 can have a comparatively small width so that the amount of the rubber used is much smaller than that of the oil seal of rubber periphery type.

As the reinforcement ring 2 is shrink fitted to the housing 5, a radial compression load is applied to the entire periphery of the reinforcement ring 2. However, since the free end 7 of the outer periphery 3 of the reinforcement ring 2 is curved at a large radius R of curvature, and since the inner peripheral end 12 of the annular side part 8 is bent, the reinforcement ring 2 exhibits a sufficiently large mechanical strength to withstand such a compression load in spite of the extremely small thickness t.

In addition, the rubber lip 14 is secured by baking to both sides of the inner peripheral end of the metallic reinforcement ring 2 and the annular rubber plate 15 integral with the lip 14 is secured to the outer surface of the annular side part 8 and the outer surface of the two-stepped bend 10 of the metallic reinforcement ring so that the large baking area is provided between the unitary rubber structure including the lip 14 and the rubber plate 15 and the reinforcement ring 2 thereby to ensure a stable holding of the rubber structure.

The securement of the lip 14 will be further enhanced if a multiplicity of ribs 13 are formed on the inner peripheral end 12 of the reinforcement ring 2.

The lip 14 is pressed against the rotor shaft 9 by the resilient force of the spring 17, force generated by the oil pressure in the oil chamber O and by the resiliency of the lip 14 itself, to make a continuous and stable sliding contact with the rotary shaft 9 to prevent the leak of oil therethrough.

The described embodiment is not exclusive and various changes and modifications may be imparted thereto without departing from the scope of the invention which is limited solely by the appended claims.

What is claimed is:

1. In a metal periphery type oil seal provided at its outer peripheral portion with a metallic reinforcement member adapted to be fitted into a stationary member and provided at its inner peripheral portion with a rubber lip adapted to make a sliding contact with a rotary shaft, said reinforcement member being of a substantially L-shaped cross section having an outer peripheral portion and an annular side portion, said rubber lip being integrally formed with an annular rubber plate which is secured to the outer surface of said annular side portion of said reinforcement member; the improvement wherein said outer peripheral portion has a free end inwardly curved at a radius of curvature considerably larger than the thickness of the metal comprising said metallic reinforcement member and which extends over an angle of not less than 90°, said annular side portion having a bent inner peripheral end, said rubber lip being secured to said reinforcement member in such a manner as to clamp said inner peripheral end of said annular side portion, said outer peripheral portion and said annular side portion being joined to each other through a two-stepped bent portion, said annular rubber plate being formed integrally with an enlarged rubber ring portion secured to the outer surface of said two-stepped bent portion, said enlarged rubber ring portion having an outside diameter larger than the outside diameter of said reinforcement member.

2. An oil seal as claimed in claim 1, wherein a plurality of reinforcement ribs are formed on the bent inner end of said annular side portion of said reinforcement member.

* * * * *